United States Patent

[11] 3,586,954

[72] Inventor Henri Carves
Paris, France
[21] Appl. No. 774,278
[22] Filed Nov. 8, 1968
[45] Patented June 22, 1971
[73] Assignee L'Eclairage Des Vehicules Sur Rail (E. V. R.),
Paris, France
[32] Priority Nov. 9, 1967
[33] France
[31] 127633

[54] EQUIPMENT FOR CHARGING ACCUMULATOR BATTERIES
3 Claims, 1 Drawing Fig.
[52] U.S. Cl. .................................................. 320/2, 320/56
[51] Int. Cl. .................................................. H02j 7/00
[50] Field of Search ........................................... 320/20, 21, 22, 51, 52, 53, 2, 56

[56] References Cited
UNITED STATES PATENTS

| | | | |
|---|---|---|---|
| 2,941,613 | 6/1960 | DiPerna ...................... | 320/20 |
| 2,898,539 | 8/1959 | Lozeau ....................... | 320/51 |
| 2,710,936 | 6/1955 | Lowry ........................ | 320/2 |
| 3,679,549 | 5/1954 | Rezer ......................... | 320/51 |
| 1,993,914 | 3/1935 | Bohm ......................... | 320/51 |
| 1,891,072 | 12/1932 | Tyrrell ........................ | 320/51 |
| 1,795,462 | 3/1931 | Woodbridge ................. | 320/51 |
| 1,452,877 | 4/1923 | Hulse ......................... | 320/51 |

*Primary Examiner*—William M. Shoop, Jr.
*Assistant Examiner*—John M. Gunther
*Attorney*—Sughrue, Rothwell, Mion, Zinn & MacPeak

ABSTRACT: A winding of an electric traction motor of an electric powered vehicle is employed as a smoothing choke in the charging circuit for an accumulator battery which normally supplies the power to the traction motor during vehicle operation.

PATENTED JUN22 1971 3,586,954
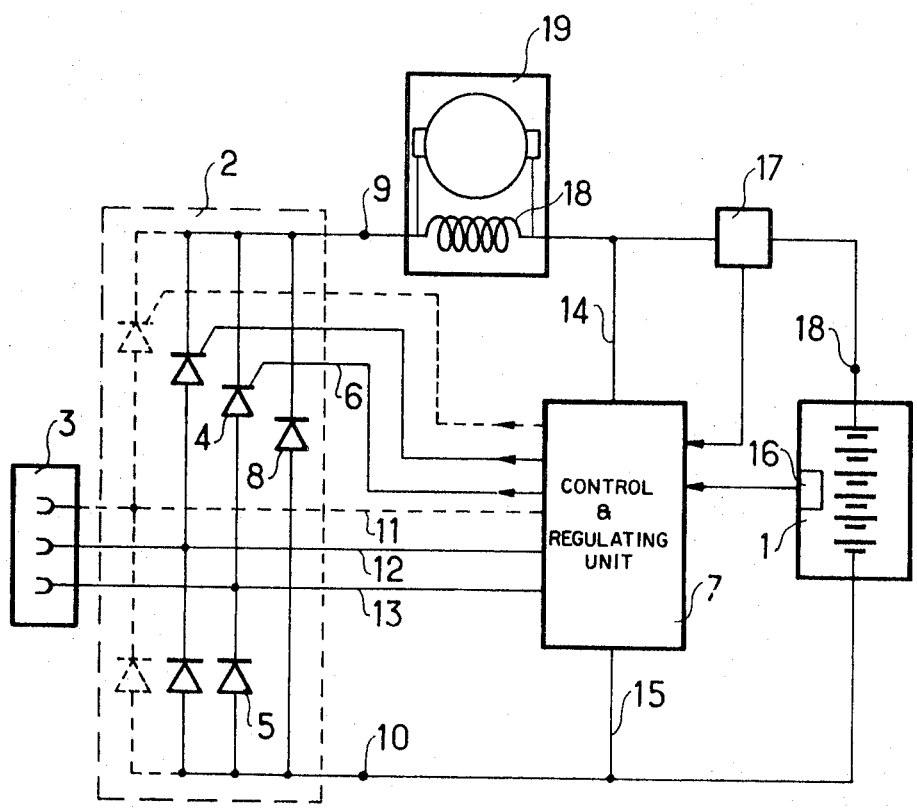

3,586,954

EQUIPMENT FOR CHARGING ACCUMULATOR BATTERIES

BACKGROUND OF THE INVENTION

This invention relates to power drive units consisting of an electric motor and an accumulator battery with the motor adapted to be driven normally, or in exceptional cases, by electric energy from the battery. The present invention is particularly directed to units of this type which are carried by mobile vehicles. By way of nonlimiting illustration, a unit may be within an automobile vehicle, and the electric motor may comprise a traction motor, a motor serving an electrodynamic braking function, or any motor providing an auxiliary function.

DESCRIPTION OF THE PRIOR ART

Known equipment for charging a battery from an industrial-frequency alternating-current source generally comprises one or more rectifier bridges and a charge-in regulating device. However, equipment consisting of these elements can only insure correct charging of the battery if its output voltage is absolutely constant. Unfortunately, the output voltage of the rectifier bridge is not generally constant, but fluctuates due to the very principle of operation of the rectifier bridges. These fluctuations are particularly appreciable in the case where the bridge operates with a controllable semiconductor or rectifier means. In the case where controllable rectifiers are used, a smoothing diode is connected in parallel with the rectifier bridge to insure continuity of the current at the commutation of the controlled rectifiers, but can do nothing against these voltage fluctuations. These voltage fluctuations produce considerable fluctuations in the charging current by reason of the relatively low value of the internal resistance of the battery. The effect of this is an increase in losses and incorrect charging of the battery.

It is therefore necessary to overcome these disadvantages and the most effective and least costly arrangement is to employ a smoothing choke which is connected in series with the battery to be recharged. The smoothing choke is the heaviest element of the battery-charging equipment and is the essential obstacle to the installation of such equipment on relatively light electrically operated vehicles. Due to the need for a smoothing choke, the known equipment for charging accumulator batteries is generally too heavy to be mounted on the electrical vehicle, so consequently the batteries of the vehicle can only be charged in the place where such charging equipment is located. This substantially reduces the economical advantage of such a vehicle.

SUMMARY OF THE INVENTION

The present invention is directed to a system for recharging accumulator batteries for use with a unit including an accumulator battery and at least one electric motor. The charging system according to the invention is distinguished by its lightness and is preferably employed aboard mobile craft such as electrically driven vehicles. This allows the vehicle to be recharged at any station in which case the only equipment necessary at the station is an electrical connecting socket carrying the alternating current source. The system of the present invention is characterized by the employment of one winding of an electric motor carried by the vehicle which is arranged to perform the function of the smoothing choke in the charging circuit. Specifically, the system is such that at least one rectifier bridge has its output terminals connected to the terminals of an accumulator battery through at least one portion of one winding of an associated electric motor carried by the vehicle. The system, therefore, makes it possible to eliminate the auxiliary or separate choke thus affording a very considerable reduction in the cost, the weight, and overall dimensions of the accumulator battery-charging unit.

For the convenience of the description, reference will be made by way of example to electrically driven land vehicles and this description will be given with reference to the accompanying drawing which illustrates diagrammatically and without limitation one practical embodiment of the invention.

BRIEF DESCRIPTION OF THE DRAWING

The single FIGURE is a schematic view of the electrical circuit of the charging system of the present invention.

DESCRIPTION OF THE PREFERRED EMBODIMENT

Referring to the drawing, there is shown the system of the present invention for charging an accumulator battery 1. The circuit incorporates a rectifier indicated generally at 2 formed of one or more bridges, depending upon the number of phases of the alternating current supply 3. Each bridge is formed of two rectifiers. Rectifier such as that indicated at 4, comprises a controllable rectifier. The firing of a controllable rectifier is controlled by a control electrode 6, which is connected to a control and regulating unit 7, shown in block form, while the other rectifier for each bridge as indicated at 5, constitutes an uncontrolled diode.

A smoothing diode 8 is connected to the output terminals 9 and 10 of the rectifier unit 2, these terminals being connected to the terminals of the accumulator battery 1 to be charged.

The control and regulating unit 7 is of any conventional type and supplied by alternating current voltage source through the conductors 11, 12 and 13 which are connected to the current supply unit 3. The unit 7 is capable of controlling the rectifiers of the bridge 2 in synchronism with the voltage at source 3, and comprises means for regulating the charge as a function of the voltage across the terminals of the battery. The device for measuring this voltage is diagrammatically represented by the conductors 14 and 15 as a function of the pressure of the gases evolved in the accumulator. The pressure detector is diagrammatically represented at 16 and the value of the charging current is measured by the device diagrammatically illustrated at 17.

In accordance with the present invention, at least one output terminal such as terminal 9 of the rectifier unit 2 is connected to one of the terminals of the accumulator battery 1 through a smoothing choke diagrammatically illustrated at 18. The smoothing choke 18 is formed of at least one portion of at least one of the windings of an electric motor 19 which, in the example chosen by way of illustration, may be either a motor carried by the vehicle to perform an auxiliary function or the actual traction motor of the vehicle. The winding 18, for instance, may comprise the field winding of the motor 19.

It is further obvious that the system, according to the present invention, may incorporate switching means (not shown in the figure) to enable the motor winding 18 to be connected into the charging circuit of the accumulator battery 1 and optionally, to enable the choke 18 to be adjusted to an optimum of value by a combination of the windings or winding fractions of the motor 19 in any conventional manner. It is also obvious that many modifications in the practical construction may be employed without departing from the scope of the present invention.

What I claim is:

1. In a system comprising an electric motor having at least one winding, said motor powered by an accumulator battery which is recharged by a rectified alternating current, the improvement comprising: means for connecting a winding of said electric motor between said source and said accumulator battery whereby, during the recharging of the battery, said winding acts as a choke coil to smooth the charging current of the accumulator battery.

2. The system as claimed in claim 1 wherein said motor comprises the traction motor for a mobile craft, and said winding comprises the field winding of said traction motor.

3. In a battery-powered electric motor drive system wherein said battery is an accumulator battery, the improvement comprising: a recharging circuit comprising a source of rectified alternating current for recharging said accumulator battery, and control and regulating means for placing a coil means of said electric motor in series with said accumulator battery for smoothing the charging current to said accumulator battery.